US 11,711,739 B2

United States Patent
Säily et al.

(10) Patent No.: US 11,711,739 B2
(45) Date of Patent: Jul. 25, 2023

(54) SUPPORTING MOBILITY DURING LOW ACTIVITY STATE

(71) Applicant: Nokia Technologies Oy, Espoo (FI)

(72) Inventors: Mikko Säily, Laukkoski (FI); Tommi Jokela, Espoo (FI); Sofonias Hailu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 48 days.

(21) Appl. No.: 16/494,950

(22) PCT Filed: Mar. 23, 2017

(86) PCT No.: PCT/FI2017/050204
§ 371 (c)(1),
(2) Date: Sep. 17, 2019

(87) PCT Pub. No.: WO2018/172596
PCT Pub. Date: Sep. 27, 2018

(65) Prior Publication Data
US 2020/0288362 A1 Sep. 10, 2020

(51) Int. Cl.
*H04W 36/08* (2009.01)
*H04W 12/06* (2021.01)
(Continued)

(52) U.S. Cl.
CPC .......... *H04W 36/08* (2013.01); *H04W 12/06* (2013.01); *H04W 52/0209* (2013.01); *H04W 74/0833* (2013.01)

(58) Field of Classification Search
CPC ........ H04W 76/27; H04W 24/02; H04W 4/18
See application file for complete search history.

(56) References Cited

U.S. PATENT DOCUMENTS

| 2016/0066255 A1* | 3/2016 | Marinier | H04W 48/16 370/350 |
| 2016/0135247 A1* | 5/2016 | Ozturk | H04W 36/0016 455/436 |
| 2018/0332561 A1* | 11/2018 | Da Silva | H04W 68/02 |

FOREIGN PATENT DOCUMENTS

| CN | 104137608 A | 11/2014 |
| CN | 105075146 A | 11/2015 |

(Continued)

OTHER PUBLICATIONS

"Report of 3GPP TSG RAN WG2 meeting #96", 3GPP TSG-RAN Working Group 2 meeting #97, R2-1700671, Agenda : 2.2, ETSI MCC, Nov. 14-18, 2016, pp. 1-231.
(Continued)

*Primary Examiner* — Khalid W Shaheed
(74) *Attorney, Agent, or Firm* — Brake Hughes Bellermann LLP

(57) ABSTRACT

An embodiment may comprise: transmitting, by a user device in a low activity state a type of the low activity state being according to an anchor access node, a random access message to a network node providing a target cell of a cell reselection. The method may also comprise, in response to receiving a random access response for the random access message from the network node providing the target cell, transmitting, to the network node providing the target cell, a radio connection reactivation request, the reactivation request comprising an indication of an anchor access node of the user device. The method may also comprise, in response to the radio connection reactivation request, receiving a radio connection reactivation message indicating a radio connection reactivation to the anchor access node as a logical link associated with a radio link provided by the target cell of the cell reselection or receiving an inactivation message.

11 Claims, 12 Drawing Sheets

(51) Int. Cl.
*H04W 52/02* (2009.01)
*H04W 74/08* (2009.01)

(56) References Cited

FOREIGN PATENT DOCUMENTS

| | | |
|---|---|---|
| CN | 105657861 A | 6/2016 |
| EP | 2983405 A1 | 2/2016 |
| WO | 2009057045 A2 | 5/2009 |
| WO | 2013013539 A1 | 1/2013 |
| WO | 2016/064458 A1 | 4/2016 |
| WO | 2016/105570 A1 | 6/2016 |

OTHER PUBLICATIONS

"Draft Report of 3GPP TSG RAN WG2 meeting #96", 3GPP TSG-RAN Working Group 2 meeting #97, R2-17xxxx, Agenda : 2.2, ETSI MCC, Nov. 14-18, 2016, pp. 1-232.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331, V14.1.0, Dec. 2016, pp. 1-654.

"5G architecture options—full set", Joint RAN/SA meeting, RP-161266, Deutsche Telekom AG, Jun. 14, 2016, pp. 1-11.

"3rd Generation Partnership Project; Technical Specification Group Radio Access Network; LTE Radio Access Network (RAN) enhancements for diverse data applications (Release 11)", 3GPP TR 36.822, V11.0.0, Sep. 2012, pp. 1-49.

"3rd Generation Partnership Project; Technical Specification Group Radio Access Network; Study on Scenarios and Requirements for Next Generation Access Technologies; (Release 14)", 3GPP TR 38.913, V0.3.0, Mar. 2016, pp. 1-30.

International Search Report and Written Opinion received for corresponding Patent Cooperation Treaty Application No. PCT/FI2017/050204, dated Jul. 10, 2017, 16 pages.

"Mobility between LTE and NR for inactive Ues", 3GPP TSG-RAN WG2 #97, Tdoc R2-1700874, Agenda : 10.3.2, Ericsson, Feb. 13-17, 2017, pp. 1-5.

"3rd Generation Partnership Project; Technical Specification Group Radio Access Network; Study on New Radio Access Technology; Radio Interface Protocol Aspects (Release 14)", 3GPP TR 38.804, V1.0.0, Mar. 2017, pp. 1-56.

"Motivation for New WI proposal on enhancements of Light connection for LTE", 3GPP TSG RAN Meeting #75, RP-170397, Agenda : 10.1.2, Intel Corporation, Mar. 6-9, 2017, pp. 1-7.

Office Action for Chinese Application No. 201780091044.1, dated Sep. 5, 2022, 9 pages.

Extended European Search Report received for corresponding European Patent Application No. 17901519.3, dated Sep. 17, 2020, 10 pages.

\* cited by examiner

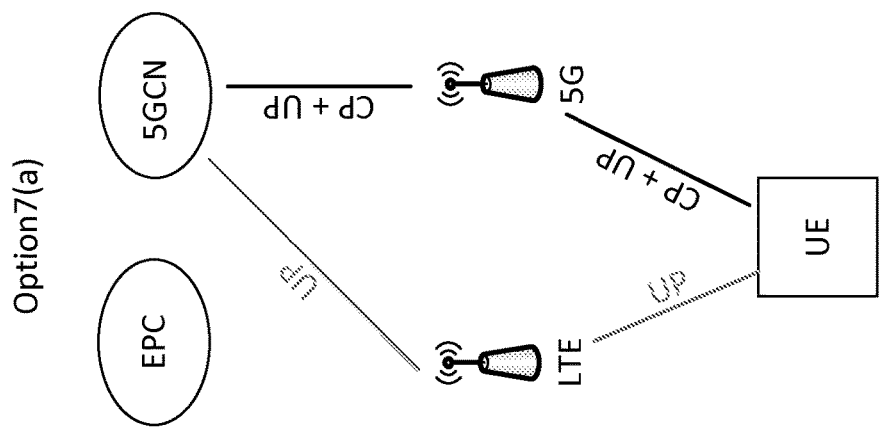
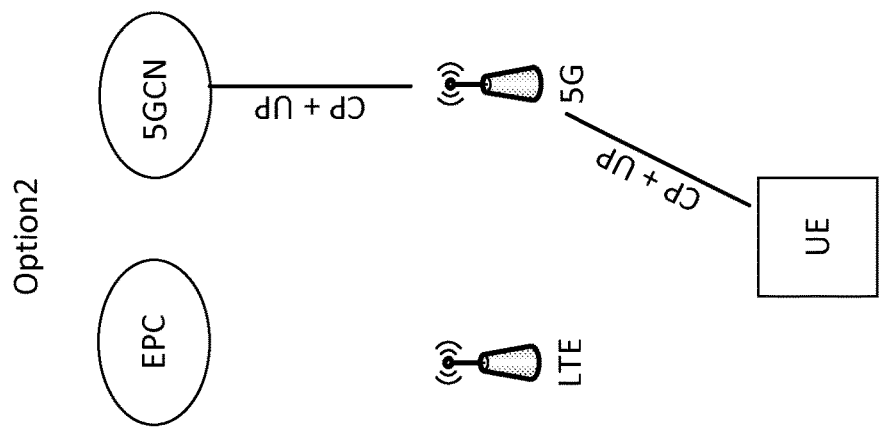
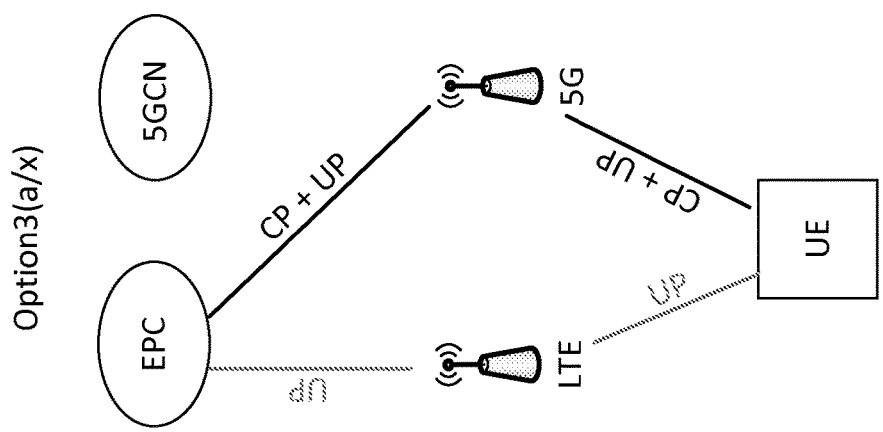
Figure1

SUPPORTING MOBILITY DURING LOW ACTIVITY STATE

RELATED APPLICATION

This application was originally filed as PCT Application No. PCT/FI2017/050204 on Mar. 23, 2017.

BACKGROUND

Field

Communications in cellular or radio networks.

Background

One of the topics that is under discussion in relation to 5G or New Radio is UE state handling. There seem to be a consensus in both LTE release 14 work and new radio (NR) study that a new radio access network (RAN) controlled state is required in addition to radio resource control (RRC) Idle and RRC Connected. This state is referred as Light Connected in LTE and RRC Inactive in NR. Among the common characteristics of Light Connected and RRC Inactive include maintenance of RAN to Core Network (CN) connection, storing of UE context and cell reselection based mobility.

BRIEF DESCRIPTION

According to certain embodiments, a method may comprise transmitting, by a user device in a low activity state a type of the low activity state being according to an anchor access node, a random access message to a network node providing a target cell of a cell reselection. The method may also comprise, in response to receiving a random access response for the random access message from the network node providing the target cell, transmitting, to the network node providing the target cell, a radio connection reactivation request, the reactivation request comprising an indication of the anchor access node of the user device. The method may also comprise, in response to the radio connection reactivation request, receiving a radio connection reactivation message indicating a radio connection reactivation to the anchor access node as a logical link associated with a radio link provided by the target cell of the cell reselection or receiving an inactivation message.

In certain embodiments, a method comprise receiving, by an anchor access node for a user device, a radio connection reactivation request in relation to a cell reselection procedure and during a state transition of the user device to a connected state. The method may also comprise carrying out a radio connection reactivation or transmitting an inactivation message. The radio connection to the user device may be reactivated as a logical link associated with a radio link provided by a target cell of the cell reselection.

An apparatus, according to certain embodiments, may comprise at least one processor and at least one memory including computer program code. The at least one memory and the computer program code may be configured to, with the at least one processor, cause the apparatus at least to transmit, by a user device in a low activity state a type of the low activity state being according to an anchor access node, a random access message to a network node providing a target cell of a cell reselection. The at least one memory and the computer program code may also be configured to, with the at least one processor, cause the apparatus at least to, in response to receiving a random access response for the random access message from the network node providing the target cell, transmit, to the network node providing the target cell, a radio connection reactivation request, the reactivation request comprising an indication of the anchor access node of the user device. The at least one memory and the computer program code may further be configured to, with the at least one processor, cause the apparatus at least to, in response to the radio connection reactivation request, receive a radio connection reactivation message indicating a radio connection reactivation to the anchor access node as a logical link associated with a radio link provided by the target cell of the cell reselection or receive an inactivation message.

An apparatus, in certain embodiments, may comprise at least one processor and at least one memory including computer program code. The at least one memory and the computer program code may be configured to, with the at least one processor, cause the apparatus at least to receive, by an anchor access node for a user device, a radio connection reactivation request in relation to a cell reselection procedure and during a state transition of the user device to a connected state. The at least one memory and the computer program code may also be configured to, with the at least one processor, cause the apparatus at least to carry out a radio connection reactivation or transmitting an inactivation message. The radio connection to the user device may be reactivated as a logical link associated with a radio link provided by a target cell of the cell reselection.

A distributed computing system, in certain embodiments, may comprise a radio node, configured to receive a radio connection reactivation request in relation to a cell reselection procedure and during a state transition of the user device to a connected state, and configured to communicate the radio connection reactivation request to a server and to the user device. The distributed computing system may also comprise the server configured to carry out a radio connection reactivation. The radio connection may be reactivated as a logical link associated with a radio link provided by a target cell of the cell reselection, and the radio connection reactivation may be communicated to the radio node, or the radio connection inactivation may be communicated to the radio node.

An apparatus, according to certain embodiments, comprise means for transmitting, by a user device in a low activity state a type of the low activity state being according to an anchor access node, a random access message to a network node providing a target cell of a cell reselection. The apparatus may also comprise means for, in response to receiving a random access response for the random access message from the network node providing the target cell, transmitting, to the network node providing the target cell, a radio connection reactivation request, the reactivation request comprising an indication of an anchor access node of the user device. The apparatus may further comprise means for, in response to the radio connection reactivation request, receiving a radio connection reactivation message indicating a radio connection reactivation to the anchor access node as a logical link associated with a radio link provided by the target cell of the cell reselection or receiving an inactivation message.

According to certain embodiments, an apparatus may comprise means for receiving, by an anchor access node for a user device, a radio connection reactivation request in relation to a cell reselection procedure and during a state transition of the user device to a connected state. The apparatus may also comprise means for carrying out a radio connection reactivation or transmitting an inactivation message. The radio connection to the user device may be reactivated as a logical link associated with a radio link provided by a target cell of the cell reselection.

A computer program product, according to certain embodiments, may be encoded with instructions for performing the process. The process may comprise transmitting, by a user device in a low activity state a type of the low activity state being according to an anchor access node, a random access message to a network node providing a target cell of a cell reselection. The process may also comprise, in response to receiving a random access response for the random access message from the network node providing the target cell, transmitting, to the network node providing the target cell, a radio connection reactivation request, the reactivation request comprising an indication of an anchor access node of the user device. The process may further comprise, in response to the radio connection reactivation request, receiving a radio connection reactivation message indicating a radio connection reactivation to the anchor access node as a logical link associated with a radio link provided by the target cell of the cell reselection or receiving an inactivation message.

A computer program product, in certain embodiments, may be encoded with instructions for performing the process. The process comprise receiving, by an anchor access node for a user device, a radio connection reactivation request in relation to a cell reselection procedure and during a state transition of the user device to a connected state. The process may also comprise carrying out a radio connection reactivation or transmitting an inactivation message. The radio connection to the user device may be reactivated as a logical link associated with a radio link provided by a target cell of the cell reselection.

According to certain embodiments, a non-transitory computer-readable medium encoded with instructions that, when executed in hardware, perform a process. The process may comprise transmitting, by a user device in a low activity state a type of the low activity state being according to an anchor access node, a random access message to a network node providing a target cell of a cell reselection. The process may also comprise, in response to receiving a random access response for the random access message from the network node providing the target cell, transmitting, to the network node providing the target cell, a radio connection reactivation request, the reactivation request comprising an indication of an anchor access node of the user device. The process may further comprise, in response to the radio connection reactivation request, receiving a radio connection reactivation message indicating a radio connection reactivation to the anchor access node as a logical link associated with a radio link provided by the target cell of the cell reselection or receiving an inactivation message.

In certain embodiments, a non-transitory computer-readable medium encoded with instructions that, when executed in hardware, perform a process. The process comprise receiving, by an anchor access node for a user device, a radio connection reactivation request in relation to a cell reselection procedure and during a state transition of the user device to a connected state. The process may also comprise carrying out a radio connection reactivation or transmitting an inactivation message. The radio connection to the user device may be reactivated as a logical link associated with a radio link provided by a target cell of the cell reselection.

BRIEF DESCRIPTION OF THE DRAWINGS

For proper understanding of the invention, reference should be made to the accompanying drawings, wherein:

FIG. 1 illustrates architecture options for 5G.

DESCRIPTION

Figure 2:
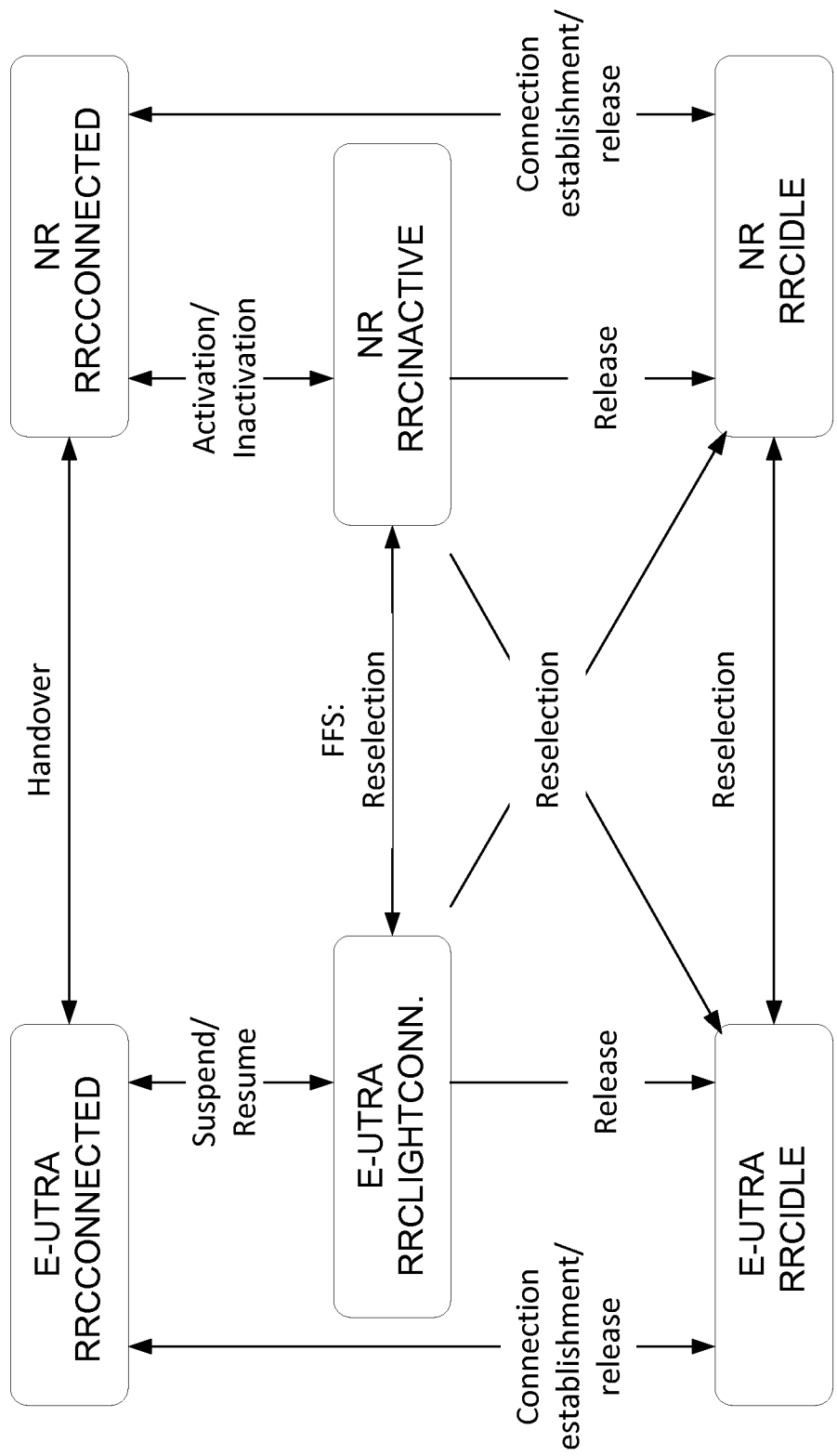
FIG. 2 illustrates a state transition diagram for enhanced LTE (eLTE) and NR, including inter-RAT reselection.

The physical layers and protocol layers in fifth generation (5G) communication systems may rely on a flexible design to support different use cases, vertical segments, different frequency bands, and to maximize the energy and spectral efficiency.

The current architecture in long term evolution (LTE) networks is fully distributed in the radio network and fully centralized in the core network (CN). For low latency, content is brought close to the radio network, which may lead to local break out and Multi-Access Edge Computing (MEC). 5G may use an edge cloud and local cloud architecture. Edge computing may include a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality.

FIG. 1 illustrates architecture options for 5G. As may be seen from FIG. 1, 5G may be deployed as a standalone system or together with LTE. A 5G device, which may be a user equipment (UE), may have simultaneous connection to 5G and LTE. The multi-connectivity and aggregation may increase the user data rate and improve the connection reliability.

5G as deployed as a standalone solution without LTE is called Option 2 in third generation partnership project (3GPP), and is shown in the center of FIG. 1. 5G may also use non-standalone solution with dual connectivity to LTE. The expected approach in Release 15 may use an existing evolved packet core (EPC) network. 5G base stations, also known as next generation (NG) base stations (gNodeB or gNB) may connect to the EPC via an LTE base station. This approach is called Option 3/3a/3x in 3GPP and is illustrated on the left side of FIG. 1. Option 3a provides a bearer in 5G node with a separate S1-interface to the gateway, whereas options 3/3x are different kinds of split bearers: option 3x splitting data in the 5G node and option 3 splitting data in the LTE node. Later 3GPP releases may provide the option to connect an LTE eNodeB to the 5G core network (5G CN). This approach is called Option 7(a) and is illustrated on the right side of FIG. 1.

LTE release 14 and 5G New Radio (NR) in particular may need to address UE state handling. In this regard, a new radio access network (RAN) controlled state may be used in addition to radio resource control (RRC) idle and RRC connected. This state may be referred as light connected in LTE and RRC inactive in NR. Both light connected and RRC inactive may have similar characteristics although they may not be exactly the same.

Among the common characteristics of light connected and RRC inactive include maintenance of a RAN/CN connection, storing of UE context, and cell reselection based mobility. These characteristics may reduce the signaling overhead and latency during state transition to RRC connected compared to the transition from RRC idle to RRC connected, without increasing UE power consumption.

Some differences may exist between light connected and RRC inactive. For example, data transmission from light connected is not possible. By contrast, a UE may transmit data from RRC Inactive.

In legacy networks, when an inactive UE, for example a UE in RRC idle, selects a cell in a new RAT, the UE enters RRC Idle in the new RAT. Similarly, a UE in the NR RRC inactive state may perform re-selection to another RAT and the UE enters the idle state in that RAT, for example in the cases of global system for mobile communication (GSM) enhanced data rates for global evolution (EDGE) radio access network (GERAN), universal terrestrial radio access network (UTRAN), and legacy LTE connected to EPC.

Certain embodiments relate to both long term evolution (LTE) and new radio (NR). For example, certain embodiments particularly provide methods and systems to achieve tight interworking between LTE and NR during low activity state mobility, utilizing the similarity of the characteristics of light connected and RRC inactive.

FIG. 2 illustrates a state transition diagram for enhanced LTE (eLTE) and NR, including inter-RAT reselection. Conventionally, there is not agreement regarding what the target state will be in the case that LTE is connected to an NG Core, as shown in the center of FIG. 2. Certain embodiments, by contrast, provide a method and system for tight inter NR/eLTE interworking during inactive state mobility.

Figure 3:
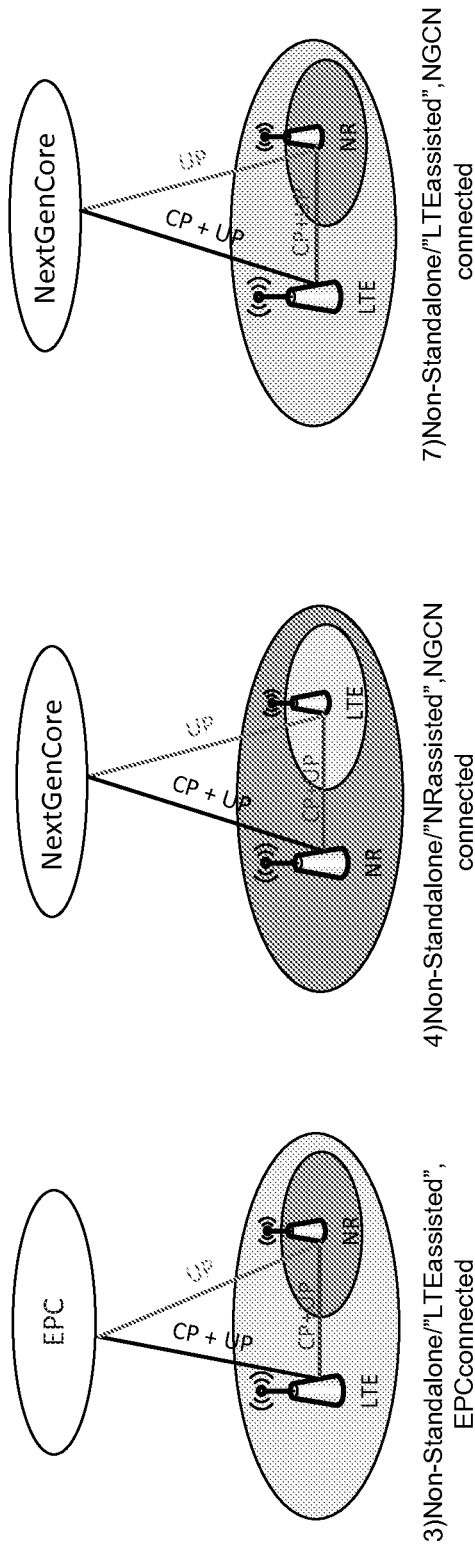
FIG. 3 illustrates LTE-NR tight interworking deployment scenarios.

FIG. 3 illustrates LTE-NR tight interworking deployment scenarios, as described in 3GPP RP-161266, which is shown herein as a non-limiting example of LTE-NR tight interworking. These scenarios assume that both the LTE and NR nodes are connected to the same CN, namely LTE EPC in scenario 3 and NextGen core in scenarios 4 and 7. Other options for interworking or tight interworking may be possible, too.

Certain embodiments may provide methods and systems that allow a UE in low activity state to reselect and camp on cells that belong to different RATs without the need for UE autonomous RRC state change nor location update. The low activity state may, for example, be RRC inactive or light connected. The RRC states in the UE and the anchor NB may remain unaltered and the same even when the UE selects a cell that belongs to a new RAT and its RAN area. The RAN area of the UE may include cells that belong to more than one RAT. The anchor NB (may also be referred as anchor network node or anchor access node) of an inactive UE is a network (or access) node that stores the UE AS context, terminates the RAN/CN connection for the UE and serves as a mobility anchor for the UE. A mobility anchor may be introduced as a centralized controller of a proxy for small cells.

Embodiments support tight interworking of NR and LTE during low activity state.

Figure 4:
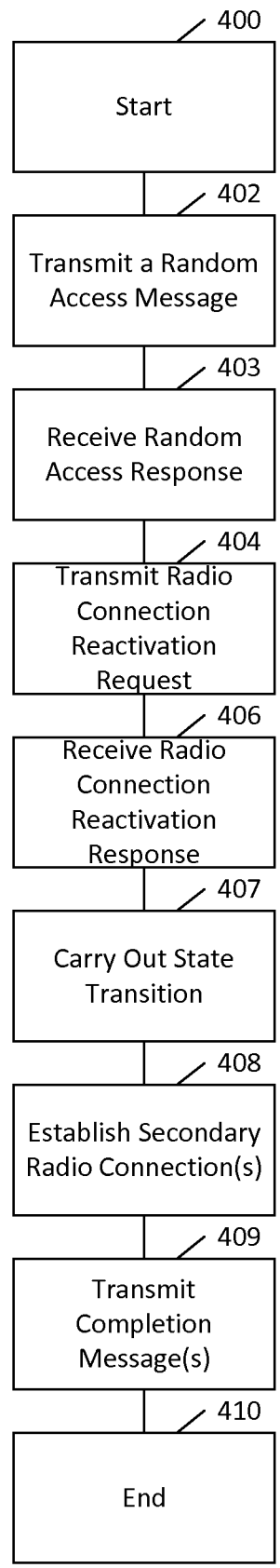
FIG. 4 illustrates an example of a method.

An embodiment of a method supporting mobility during a low activity state is now explained by means of FIG. 4. The embodiment may be carried out by a user device. The user device may be a user-operated device, such as a mobile phone, multimedia device, smart phone, tablet, personal computer, camera, video camera, or an Internet of Things device (a device embedded with electronics, software, sensors, actuators, etc. and network connectivity that enable the devices to collect and exchange data) or any suitable device. The embodiment starts in block 400.

In block 402, a user device in a low activity state transmits a random access message to a network node providing a target cell of a cell reselection. The type of the low activity state is according to an anchor access node (anchor network node), in other words RRC inactive or light connected or a corresponding state and it is unchanged until the state change to a connected state. Principles of a cell reselection is known for example in the LTE standard. In general, a user device in idle mode measures received signal levels of neighbor cell and the cell it camps on. The measurements may be reference signal received power (RSRP) or received signal strength indicator (RSRQ) or like. If the measurements for the serving cell fail (signal undetectable) or if the cell reselection criteria is fulfilled, the user device searches for another cell and carries out a cell reselection to the best available or good enough cell (some cells may be forbidden or barred, for example they are in another operator's network). The user device carries out a random access (RACH) procedure to get an access to the selected cell. Cell reselection may be triggered, if the user device moves or the network conditions change. In idle mode, the user device may carry out the measurements periodically. In autonomous cell reselection, the user device makes the selection.

An anchor access node as a master access node acts as a mobility anchor. In the scenario of FIG. 3, the macro cell typically operates as a mobility anchor. A master access node may be needed for reducing signaling towards core network when multi-connectivity is provided, or in high system load or limited user capability cases. A mobility anchor is a logical entity provided by a master access node for active UEs. A mobility anchor may be introduced as a centralized controller of a proxy for small cells. In the case unlicensed spectrum is used, a node controlling the licensed spectrum usage serves as a mobility anchor.

In block 404, in response to receiving (at 403) a random access response for the random access message from the network node providing the target cell and during a state transition to a connected state, a radio connection reactivation request is transmitted to the network node providing the target cell. The reactivation request comprises an indication of an anchor access node (anchor network node) of the user device. The user device may start the reactivation procedure when it has data to transmit or it wants to make a location update, etc. It should be understood that the user device may carry out the cell reselection once or a plurality of times before transmitting the radio connection reactivation request. In an embodiment, the random access procedure is triggered when the user device has data to transmit or it wants to make a location update, etc. and the reactivation follows as soon as the random access procedure has been finished. It should be understood that the user device may have to repeat transmitting a random access message.

An indication of an anchor access node may be a resume identity that identifying the location of the user device's context in the network. The context information is according to the type used in the radio standard the anchor node supports. The radio connection reactivation request may also comprise authentication information, such as a shortMAC-I (Message Authentication Code-Integrity) that is prepared using a stored AS security context and other inputs and a buffer status report. The authentication information may be of the type supported by the standard used in the anchor access node that is the type is according to the anchor access node. The message may also piggyback small data packet as a payload. The data packet may be ciphered using the stored AS context or it may use the security of the inter-RAT RRC re-activation request message.

In block 406, in response to the radio connection reactivation request, a radio connection reactivation message indicating a radio connection reactivation to the anchor access node as a logical link associated with a radio link provided by the target cell of the cell reselection is received.

It should be appreciated that the connection between a user device and an anchor access node is a logical link as there is no direct communication link between the user device and the anchor access node, e.g. in a similar manner as NAS procedures are over the logical link between the user device and the mobile management entity (MME) as there is no direct communication link between the user device and the MME. The direct communication link may be established between the target cell of the cell reselection and the user device by the random access procedure.

A radio connection reactivation request may comprise data and an indication of the end of data load. A (small) amount of data may be included in the payload of the message or encapsulated in it. Then the user device may receive a radio connection reactivation message indicating the radio connection reactivation as a temporal connection, or instead of receiving a radio connection reactivation message, receiving an inactivation message. The inactivation message may be "a request not admitted" type of a message or a message indicating inactivation, a root cause for the inactivation and/or that the payload was received informing that the user device does not have to retransmit the data. The user device may also change its state to a low activity state.

During the state transition to RRC connected (carried out at 407), at least one secondary radio connection for a multi-connectivity service or relaying may be established at 408, and the anchor access node may act as an anchor network node for the at least one secondary radio connection.

The reactivated RRC connection between the user device (UE) and the anchor network node may be referred to as a master RRC (M-RRC) connection. In addition to activating the RRC connection between the user device (UE) and the anchor access node (or anchor NB), the anchor NB may send the necessary context information to the new NB to create a secondary/slave RRC (S-RRC) connection. This option may depend, for example, on whether the UE has subsequent data and is multi-connectivity capable. A security key for the S-RRC may be generated using the KeNB in the anchor NB if, for example, there is a tight interworking between the RATs.

After the UE has transitioned to RRC connected, the anchor NB (a master NB after the state transition) may transfer its master role to the Secondary-NB. During a mobile terminated (MT) data transfer, the anchor NB or CN may page the UE through the cells in its RAT at the same time or in a sequential manner. For example, the UE may be paged first in the cells that belong to one RAT and then through the cells that belong to the other RAT if the paging through the first RAT fails.

The user device may, at 409, send completion messages for the radio connection reactivation and/or the establishing the at least one secondary radio connection. The embodiment ends in block 410 and it is repeatable. Examples of signaling flows and further details according to the embodiments described above are presented below by means of FIGS. 6 to 10.

Figure 5:
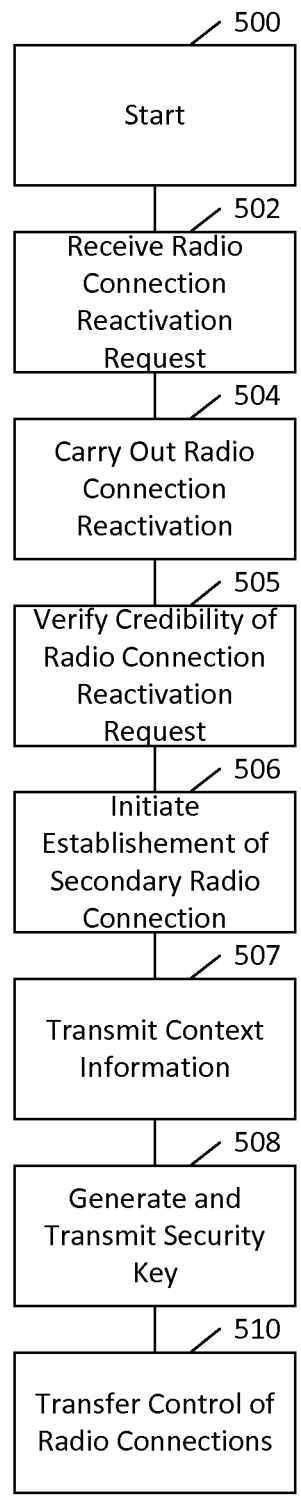
FIG. 5 illustrates another example of a method.

An embodiment of a method supporting mobility during a low activity state is now explained by means of FIG. 5. The embodiment may be carried out by a network node (such as eNB, gNB), server, host or distributed computing system which may utilize edge cloud computing, etc. suitable for operating as an anchor access node (or as a master access node), such as a mobility anchor. An anchor access node acts as a mobility anchor. In the scenario of FIG. 3, the macro cell typically operates as a mobility anchor. A mobility anchor may be needed for reducing signaling towards core network when multi-connectivity is provided, or in high system load or limited user capability cases. A mobility anchor is a logical entity provided by an anchor access node. A mobility anchor may be introduced as a centralized controller of a proxy for small cells. In the case unlicensed spectrum is used, a node controlling the licensed spectrum usage serves as a mobility anchor.

The embodiment starts in block 500.

In block 502, a radio connection reactivation request may be received in relation to a cell reselection procedure and during a state transition of a user device to a connected state. The initial state of the user device may be a low activity state. The type of the low activity state may be according to an anchor access node (anchor access node), in other words RRC inactive or light connected or a corresponding state and the state may be unchanged until the state change to a connected state. "In relation to a cell reselection procedure" may herein mean that the radio connection reactivation is triggered by a user device after a random access procedure with a selected cell reselection target cell when the user device has data to transmit (mobile oriented data) or the user device wants to carry out a location update etc.

In block 504, a radio connection reactivation is carried out, wherein the radio connection is reactivated as a logical link associated with a radio link provided by a target cell of the cell reselection thus there is no direct communication link between the user device and the anchor access node, e.g. in a similar manner as NAS procedures are over the logical link between the user device and the mobile management entity (MME) as there is no direct communication link between the user device and the MME. The direct communication link is established between the target cell of the cell reselection and the user device by the random access procedure.

A radio connection reactivation request may comprise data and an indication of the end of data load. A (small) amount of data may be included in the payload of the message or encapsulated in it. Then the node may transmit a radio connection reactivation message indicating the radio connection reactivation as a temporal connection, or instead of transmitting a radio connection reactivation message, receiving an inactivation message. The inactivation message may be "a request not admitted" type of a message or a message indicating inactivation, a root cause for the inactivation and/or that the payload was received informing that the user device does not have to retransmit the data. This operation may be controlled by an inactivity timer.

The anchor access node may, at 505, verify the credibility of the radio connection reactivation request by using authentication information provided in the radio connection reactivation request. One example of the authentication information is shortMAC-I that is prepared using a stored AS security context and other inputs. The authentication information may be of the type supported by the standard used in the anchor access node that is the type is according to the anchor access node. The message may also piggyback small data packet as a payload in which case the node forwards the data packet to a core network. The data packet may be ciphered using the stored AS context or it may use the security of the inter-RAT RRC re-activation request message.

During the state transition to RRC connected, at least one secondary radio connection (a slave connection) for a multi-connectivity service or relaying may be established at 506, and the anchor access node acts as an anchor network node for the at least one secondary radio connection. The node may, at 507, generate and transmit context information of the user device to a cell providing at least partly the multi-connectivity service or the relaying. The node may, at 508, generate and transmit a security key, such as an intermediate key (KeNB*) generated by using a stored KeNB for the at least one secondary radio connection as well. The node may after the state transition of the user device, transfer control of radio connections of the user device to a cell providing the at least one secondary radio connection.

The embodiment ends in block 510 and it is repeatable. Examples of signaling flows and further details according to the embodiments described above are presented below by means of FIGS. 6 to 12.

Figure 12:
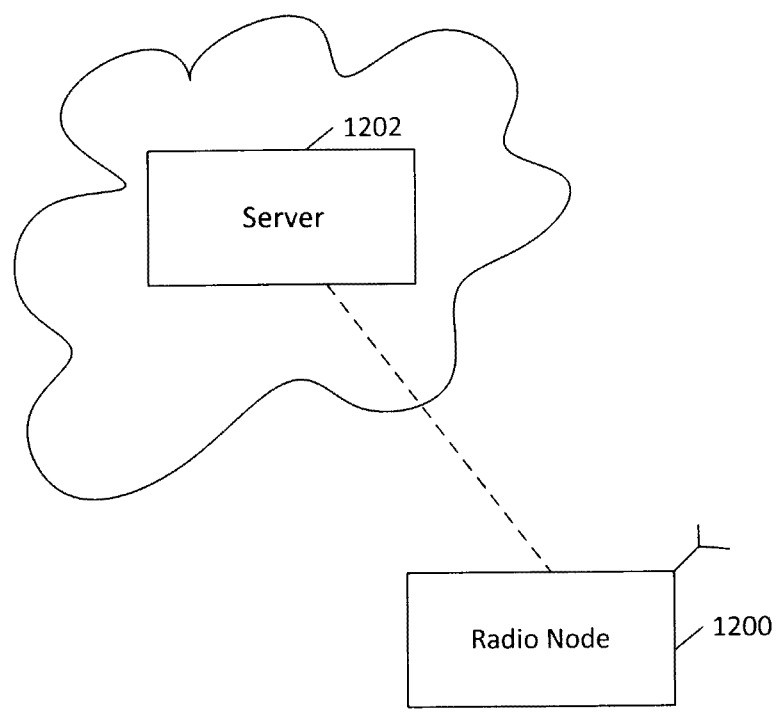
FIG. 12 illustrates an example of a system configured to utilize cloud services.

As to an edge cloud, one possible manner to carry out embodiments described above is using a distributed computing system. A simplified example of such a system is shown in FIG. 12. The system may comprise a radio node 1200, configured to receive a radio connection reactivation request in relation to a cell reselection procedure and during a state transition of the user device to a connected state, and configured to communicate the radio connection reactivation request to a server 1202 and to the user device, and the server configured to carry out a radio connection reactivation, wherein the radio connection is reactivated as a logical link associated with a radio link provided by a target cell of the cell reselection, and communicating the radio connection reactivation to the radio node, or communicating a radio connection inactivation to the radio node. It should be understood that the edge cloud server and the radio node may be stand-alone apparatuses communicating with each other via a radio path or via a wired connection or they may be located in a same entity communicating via a wired connection, etc.

Another embodiment may be carried out by a network node suitable for operating as a target node of a cell reselection. The target node carries out the random access procedure with the user device and forwards the reactivation request message to the anchor access node and the reactivation message to the user device. It may also initiate the S-RRC establishment procedure with the user device, if it receives user device's context information from the anchor access node. FIGS. 6 to 10 illustrate further detailed examples. The target node operations may also be implemented by using edge cloud.

In the following non-limiting examples, interworking is considered between eLTE and NR. However, the approach is applicable to two generic RATs. Even more generically, the approach may also be applied to a mobility scenario where the UE is camping in a cell that is not located in its anchor gNB, regardless of whether the cell is within the same or different RAT than the anchor NB. The interface between the eLTE eNB and the NR gNB may be referred to, without limitation, as the Xn interface.

In a first example implementation (first for labelling purposes only, and not by way of limitation), a deployment scenario may be considered in which eLTE and NR are connected to an NG core. A UE may be under the NR coverage when the UE transitions to RRC inactive. The UE access stratum (AS) context may be stored in the anchor gNB and the UE. The stored UE context may include, for example, data radio bearer (DRB) configuration, AS security context, and the like. The UE may be provided with a RAN notification area that includes cells that belong to eLTE and NR. The UE may reselect a cell that belongs to eLTE but is also in the UE's RAN notification area. The UE does not need to update the UE's location nor does the UE need to autonomously change RRC state to light connected during cell reselection within its notification area.

Figure 6:
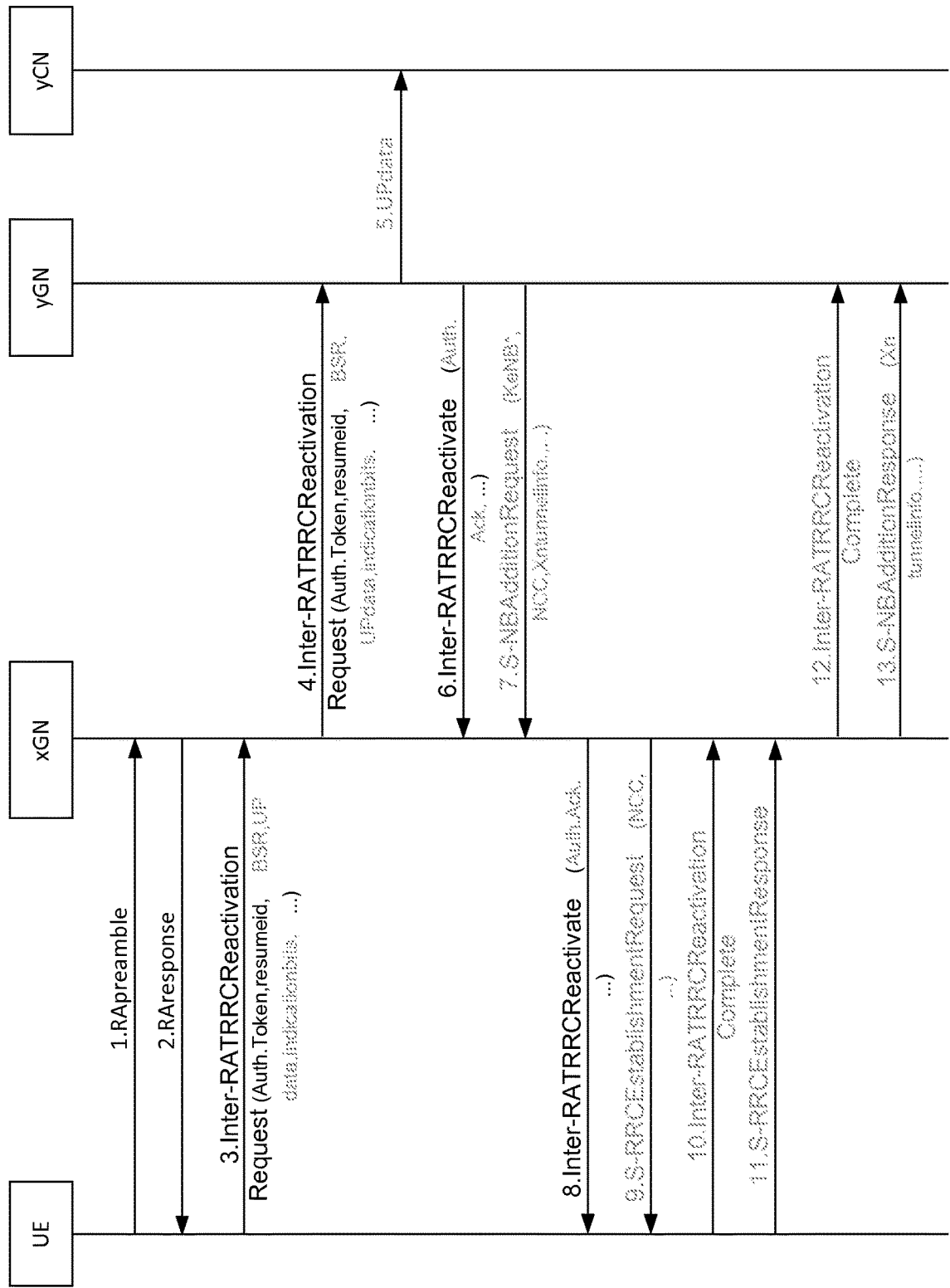
FIG. 6 illustrates an inter-RAT RRC activation procedure, according to certain embodiments.

FIG. 6 illustrates an inter-RAT RRC activation procedure, according to certain embodiments. As shown in FIG. 4, when a UE has mobile originated (MO) data to transmit, the UE may initiate an inter-RAT RRC activation procedure. This may be an RRC procedure over the logical link between the UE and the anchor gNB, which may be located in another RAT. In this case the other RAT is NR. Note that the procedure is not over the air interface nor over the Xn interface, in the same manner as the NAS procedure is not a procedure over the air interface nor over the RAN/CN interface, rather over the logical link between the UE and MME. The objective of the procedure may be to re-establish the RRC connection between the UE and the anchor gNB and the procedure may be implemented as a two-way or three-way handshake process.

Referring to FIG. 6, the steps below explain one possible detailed implementation of the first exemplary implementation. Per the considered example, the xNB refers to an eLTE eNB and yNB refers to an NR gNB. The NB gNB may serve as an anchor gNB for the UE and thus may at least store the UE AS context. The eLTE may be connected to the NGC-Core, which is referred to as yCN in this example.

At 1, the UE may send a random access channel (RACH) preamble initiating a four-way random access procedure. The RACH preamble may contain bits that indicate the size of the resource the UE requires to be granted for sending a random access (RA) msg 3. Other non-explicit indicators may be used as well, for example by mapping the resource where the RACH is sent to the amount of resource to be granted for the RA msg. 3.

At 2, the eNB may respond to the RA preamble. The response may also contain resource grant information for RA msg. 3.

At 3, the UE may send an inter-RAT RRC re-activation request message. The message may include a shortMAC-I that is prepared using the stored AS security context and other inputs, a resume Id that uniquely identifies the location of the UE context in the network, buffer status report (BSR), indication bit(s) for different purposes, and the like. The message may also piggyback a small user plane (UP) packet as a payload. The UP packet may be ciphered using the stored AS context or the UP packet may use the security of the inter-RAT RRC re-activation request message.

At 4, the eNB that received the inter-RAT RRC re-activation request message may forward the request to the anchor gNB based on the resume id.

At 5, if UP data was received, the UP data may be forwarded to the CN.

At 6, the anchor gNB may verify the UE using the shortMAC-I. After the verification, the anchor gNB may send inter-RAT RRC re-activate message to the UE through the eNB. The inter-RAT RRC re-activation message may contain a shortMAC-I that is prepared by the anchor gNB for network verification. The RRC in the anchor gNB is immediately re-activated after verifying the UE in two-way handshake approach or after an inter-RAT RRC re-activation complete message is received from the UE in three-way handshake approach.

At 7, the anchor gNB may also initiate a secondary or slave RRC establishment procedure between the UE and the new eNB, where the decision may be made based on, for example the received BSR size or indication bit(s). The S-eNB addition may be done using similar approach as S-eNB addition in connected mode multi-connectivity. The anchor gNB may send an S-eNB addition message to the new eNB, and may include S-RRC context with the addition message. The S-RRC context may include an intermediate key (KeNB*) that may be generated using KeNB that is stored in the anchor gNB, NCC that is used to generate the KeNB*, and so on. The S-eNB addition message may also contain Xn tunneling information if there is no established Xn tunnel between the new eNB and the anchor gNB. If there is already an S-RRC context, SCG configuration, etc. associated with the UE available in the new eNB, the S-eNB addition does not include a new context information rather activates the stored context information in the new eNB.

At 8, the eNB may forward the Inter-RAT RRC Activate message to the UE. This message may contain an acknowledgement of the successful authentication of the UE.

At 9, the eNB may also send an S-RRC Establishment message if an S-NB Addition message has been received from the anchor gNB. The S-RRC Establishment message may be used to create an S-RRC connection between the UE and the eNB, which may be done in a similar manner to the standard way of S-RRC addition in multi-connectivity. It may include an S-RRC configuration, NCC value that is used to create the KeNB* for the SeNB, and a shortMAC-I prepared using KeNB* and other inputs.

At 10, the UE may send an Inter-RAT RRC Reactivation Complete message. This message may be sent to acknowledge the successful receiving of the Inter-RAT RRC Reactivate message.

At 11, if the UE has received an S-RRC Establishment message, it may respond with an S-RRC Establishment Response message. If the message includes a shortMAC-I, the UE may generate an S-RRC KeNB* using a KeNB or NH depending on the value of the NCC and the UE may confirm whether the UE may successfully decipher the shortMAC-I. If so, the UE may include an acknowledgment in the S-RRC Establishment Response message. The UE may also include confirmation to other successfully received configurations.

At 12, the eNB may forward the Inter-RAT RRC Reactivation Complete message to the anchor gNB if received from the UE.

At 13, the eNB may send an S-NB Addition Response message to the anchor gNB if the establishment of the S-RRC is successful. The S-eNB Addition Response message may contain Xn tunneling information if there is no established Xn tunnel between the new eNB and the anchor gNB.

Alternatively, a two-step RACH procedure may be used. In this case, the Inter-RAT RRC Reactivation Request may be included in RA msg 1.

Figure 7:
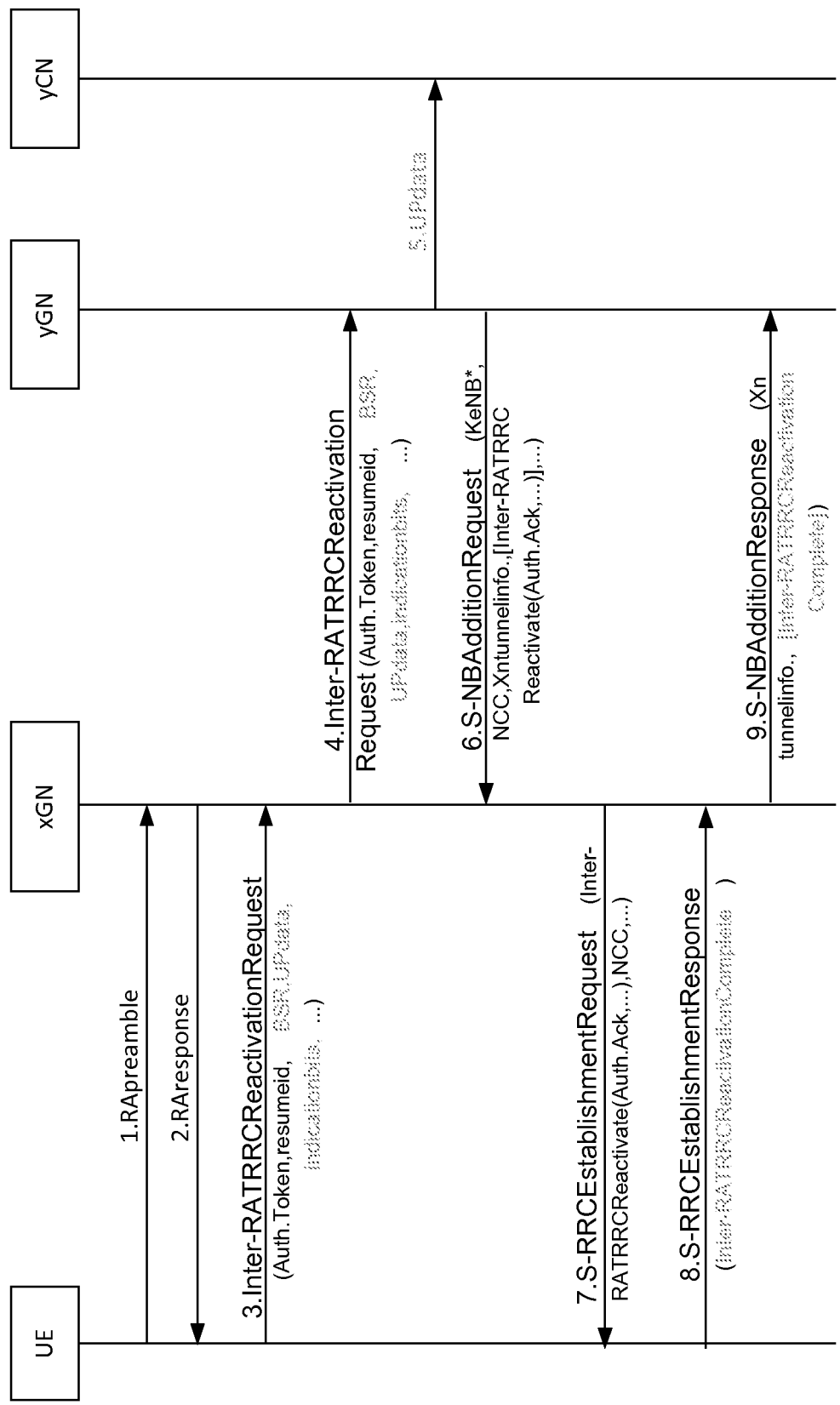
FIG. 7 illustrates RRC activation during inter-RAT inactive mode mobility procedure with encapsulated messages, according to certain embodiments.

FIG. 7 illustrates RRC activation during inter-RAT inactive mode mobility procedure with encapsulated messages, according to certain embodiments. FIG. 7 may be considered a simplified or compacted variation on the embodiment illustrated in FIG. 6.

More generally, some messages may be piggybacked to other messages and some other optional messages may be omitted from the procedure, such as the procedure shown in FIG. 6. In FIG. 7, for example, the Inter-RAT RRC Reactivate (msg 6) may be sent as a payload to S-NB Addition Request (msg 7). Moreover, the Inter-RAT RRC Reactivate (msg 8) may be sent as a payload of S-RRC Establishment (msg 9). Furthermore, the Inter-RAT RRC Reactivation Complete (msg 10) may be encapsulated in S-RRC Establishment Response (msg 11). S-RRC may be omitted. Thus, the S-RRC establishment request and S-RRC establishment response messages may be omitted. The Inter-RAT RRC Reactivation Complete (msg 11) may be encapsulated in an S-NB Addition Response (msg 12).

Figure 8:
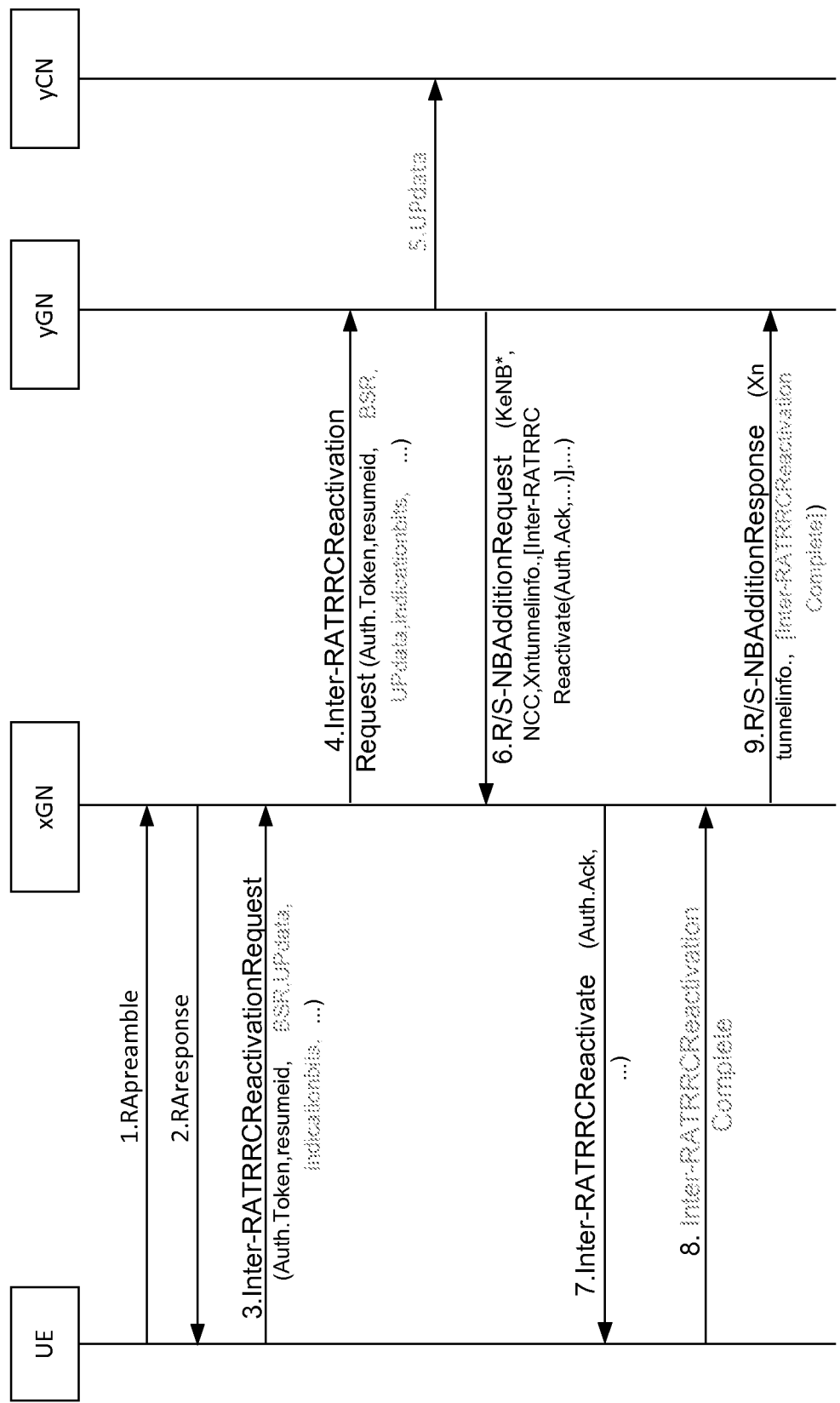
FIG. 8 illustrates RRC activation during inter-RAT inactive mode mobility procedure without S-RRC establishment, according to certain embodiments.

FIG. 8 illustrates RRC activation during inter-RAT inactive mode mobility procedure without S-RRC establishment, according to certain embodiments. In the example of FIG. 8, an S-RRC is not established. In this procedure, the new NB may be added as either a secondary NB without S-RRC or a relaying node (R-NB). Adding the new NB as a relaying NB may be useful to avoid relocation of RAN/CN connection. A similar message encapsulation approach may be used as in the previous example, namely the example shown in FIG. 7.

In an implementation example that is applicable to all the above-described implementations, the anchor gNB may transfer the anchor's role as a host for M-RRC to the SeNB. This transfer may, for example, take place after measurement reports are received regarding primary and secondary radio links. If the SeNB is located under the coverage of the anchor gNB, the link to the anchor gNB may also be reliable. In this case, the UE may also directly communicate with the anchor gNB, in the same way as in dual connectivity. If the SeNB is located out of the coverage of the anchor gNB, the primary link may not be reliable to communicate. Although the anchor gNB initially communicates with the UE through the SeNB, the anchor may transfer the anchor's role as a host of M-RRC to the SeNB after receiving the measurement report indicating the primary link is undetectable. The M-RRC role transfer to the SeNB may also occur during the state transition procedure. In this, the anchor gNB does not reactivate the RRC connection between the UE and the anchor gNB. It rather sends the necessary UE context to the SeNB so that an M-RRC connection between the UE and the SeNB is created, e.g. in the same way as the legacy context fetching procedure.

In a second example implementation (second for labelling purposes only, and not by way of limitation), a deployment scenario may be considered in which eLTE and NR are connected to EPC. A UE may have been under the eLTE coverage when the UE transitioned to light connected. The UE AS context may be stored in the anchor eNB and the UE. The stored UE context may include, for example, DRB configuration, AS security context, and the like. The UE may be provided with a RAN notification area that includes cells that belong to eLTE and NR. The UE may reselect a cell that belongs to NR but is also in its RAN notification area. The UE does not need to update its location nor autonomously change RRC state to RRC Inactive. The implementation details corresponding to the first example implementation may also apply to the second example implementation as well. There may, however, be the following changes to FIG. 6: the xNB refers to an NR gNB and yNB refers to an eLTE eNB. The eLTE eNB may serve as an anchor eNB for the UE and thus it at least stores the UE AS context. The eLTE may be connected to the EPC, which may be referred to as yCN.

In a third example implementation (third for labelling purposes only, and not by way of limitation), the following modifications may be made to the approach shown in FIG. 6. In FIG. 6, xNB and yNB may belong to the same RAT and both NBs may be connected to the same yCN. All the implementation details explained for first and second example implementations may also apply to the third example implementation. In this cases, the label "Inter-RAT" may be replaced with the more precise label "Inter-Node." Thus, the Inter-RAT RRC Reactivation Request may become an Inter-Node RRC Reactivation Request.

In a fourth example implementation (fourth for labelling purposes only, and not by way of limitation), which is applicable to all three example implementations above, the anchor NB may send an Inter-RAT RRC Inactivation message. The message may be sent to the UE after waiting for an inactivity timer or immediately after receiving the Inter-RAT RRC Reactivation Request message if the anchor NB concludes that, for example, the UE does not have further data to transmit. Thus, the UE effectively remains in the inactive state, e.g. after transmitting the small packet.

In a fifth example implementation (fifth for labelling purposes only, and not by way of limitation), upon a transition to inactive state or during RAN notification area update, the UE may be given a RAN notification area that includes cells that belong to different RATs. The anchor gNB may have information regarding the cells in neighboring RATs that may be obtained through direct communication with NB of neighboring RATs or with the assistance of the CN. The Xn interface may support inter-RAT paging during RAN initiated paging. The CN may also participate in the paging process where the anchor gNB may transfer the role of the paging initiator to the CN. The paging occasion calculation by the NBs of different RATs may be aligned, for example by using the same UE-ID during the calculation. This alignment may avoid the possibility of UE being missed during paging due to misalignment of the paging occasion calculated by the UE and the network. Moreover, this alignment may permit the UE to listen to only a single paging occasion during a discontinuous reception (DRX) cycle. When MT data is to be provided to the UE, the anchor NB or CN may page the UE through all the cells in the anchor NB's RAT at the same time. The paging could also be done in a sequential manner, for example to save signaling overhead. In this case, the UE may be paged first in the cells that belong to one RAT and then through the cells that belong to the other RAT, if the paging through the first RAT fails.

FIG. 97 illustrates a state transition diagram for inter-RAT RRC, according to certain embodiments. There are various RRC State modelling options for inter-RAT RRC activation. Assuming the UE may perform inter-RAT measurements and inter-RAT cell reselections, the RRC model and functionality mapping to different states illustrated in FIG. 2 may be used. This may be equivalent to single-RAT camping. Some 5G applications in URLLC service category may require seamless multi-RAT camping capability to enable fast system access. In this case the model with two parallel states may not provide an option for seamless operation, as one or the other system may be where the UE is camping and listening for the system information and control channels. The other system may be monitored by inter-RAT measurements configured by network. Depending on the implementation of single RAT low activity state camping, the UE may also drop the system information of the RAT where it is not actively camping, for example not reading system information and not monitoring the notification/paging.

Figure 9:
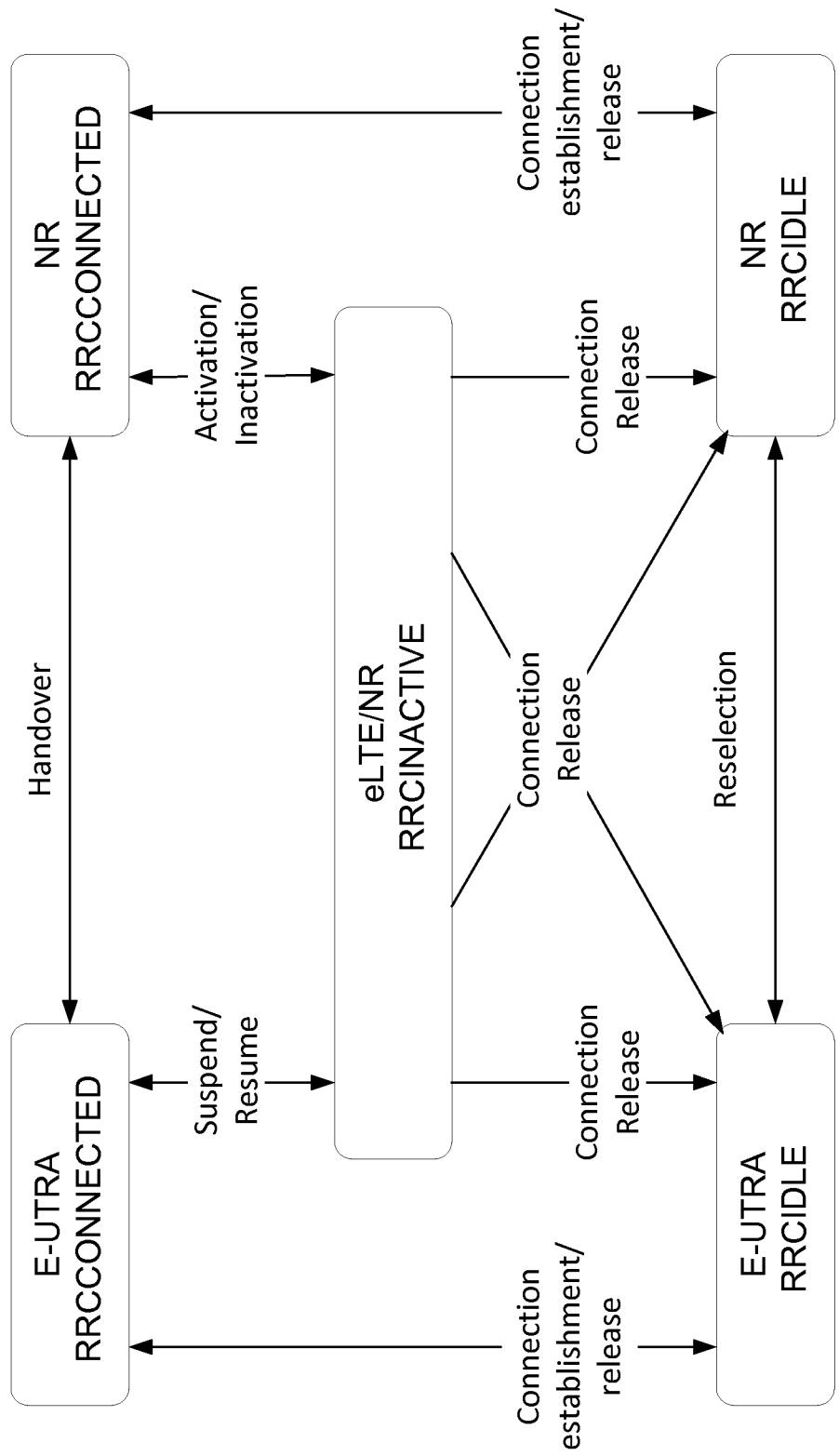
FIG. 9 illustrates a state transition diagram for inter-RAT RRC, according to certain embodiments.

With integrated low activity state as illustrated in FIG. 9, the UE may monitor both systems by inter-RAT measurements configured by network. Additionally, a benefit may come from storing the dedicated and/or on-demand logical information. For example, the UE may have on-demand/dedicated system information from one system. With the integrated low activity state, the UE may keep that system information while reselecting to the other system. Integrated low activity state may allow an implementation where the UE may keep on listening to both systems for downlink control information, paging and/or notification of incoming data.

Figure 10:
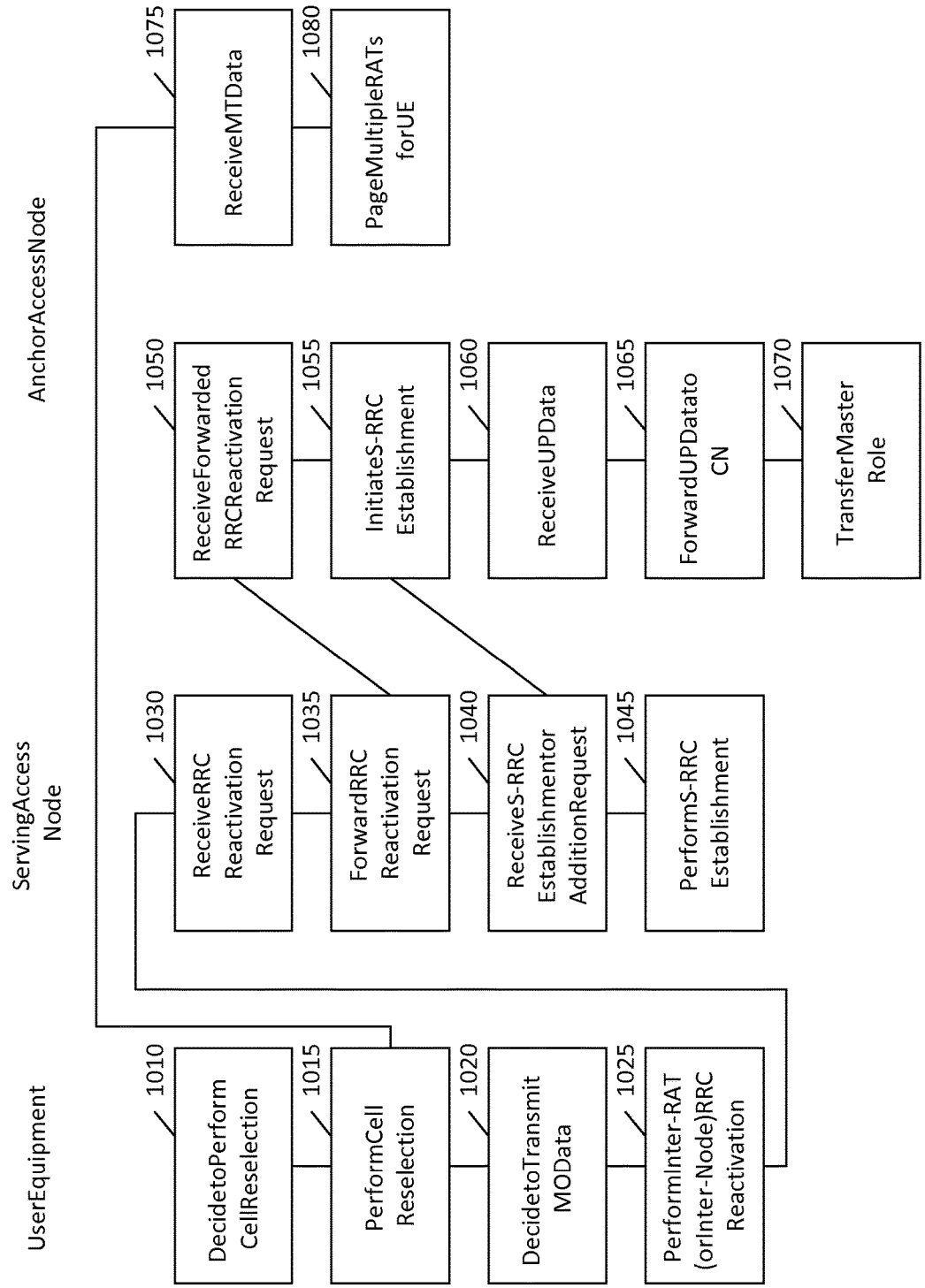
FIG. 10 is a flow chart illustrating an example of cooperation of different apparatuses.

FIG. 10 illustrates a method according to certain embodiments. As shown in FIG. 10, a method may include, at 1010, deciding, by a user equipment in a low activity state, to perform cell reselection. This deciding may be based on various factors, such as radio measurements or the like. The target cell may be selected for reselection based on being in a same radio access network notification area as the source cell.

The method may also include, at 1015, reselecting, by the user equipment in the low activity state, from a source cell of an anchor access node to a target cell of a serving access node. The low activity state may be a radio resource control inactive state or a light connected state. A radio resource control state of the user equipment may be unchanged by the reselection. Moreover, a radio resource control state of the anchor access node may be unchanged by the reselection.

In certain embodiments, as mentioned above, a radio access technology of the anchor access node may differ from a radio access technology of the serving access node. Although, in the third example embodiment discussed above, both the anchor access node and the serving access node may be of the same radio access technology.

The method may also include, at 1020, deciding, after the reselection, that the user equipment has mobile originated data to transmit. The method may further include, at 1025, performing an inter-radio-access-technology radio resource control reactivation. Alternatively, in the case where both the source and target cells have the same RAT, the UE may perform an inter-node RRC reactivation.

The reactivation may be configured to activate a radio resource control connection between the user equipment and the anchor access node. The reactivation may be configured to be performed without an autonomous radio resource control state change. Moreover, the reactivation may be configured to be performed without a location update. The reactivation may be carried out over a logical link between user equipment and the anchor access node.

Performing the reactivation may include sending an inter-RAT (or inter-node) radio resource control reactivation request to the serving access node.

The method may also include, at 1030, receiving, at a serving access node, an inter-radio-access-technology radio resource control reactivation request regarding a user equipment. This may be the same request that was submitted as part of the performance of RRC reactivation at 1025.

The method may further include, at 1035, forwarding the inter-radio-access-technology radio resource control reactivation request to an anchor access node of the user equipment based on information in the request.

The method may additionally include, at 1040, receiving a secondary radio resource control establishment request or addition request from the anchor node in response to the forwarded reactivation request. The method may also include, at 1045, performing a secondary radio resource control establishment with the user equipment based on the secondary radio resource control establishment request or addition request.

The method may also include, at 1050, receiving, at an anchor node, an inter-radio-access-technology radio resource control reactivation request regarding a user equipment from a serving access node. This may be the same request that was forwarded at 1035.

The method may further include, at 1055, initiating a secondary radio resource control establishment procedure between the user equipment the serving access node based on information in the request. The initiating may include sending a secondary radio resource control establishment request or addition request to the serving access node, which may be received at 1040. The initiating the secondary radio resource control establishment procedure may include sending context information regarding the user equipment to the serving access node. The sending the context information may be dependent on whether the user equipment is multi-connectivity capable and/or whether the user equipment has data to send.

The method may also include, at 1060, receiving user plane data with the request. The method may further include, at 1065, forwarding the user plane data to a core network.

The method may additionally include, at 1070, transferring a master role from the anchor access node to the serving access node.

The method may also include, at 1075, receiving mobile terminated data for the user equipment. The method may further include, at 10100, paging the user equipment on a plurality of radio access technologies in response to receipt of the mobile terminated data.

Figure 11:
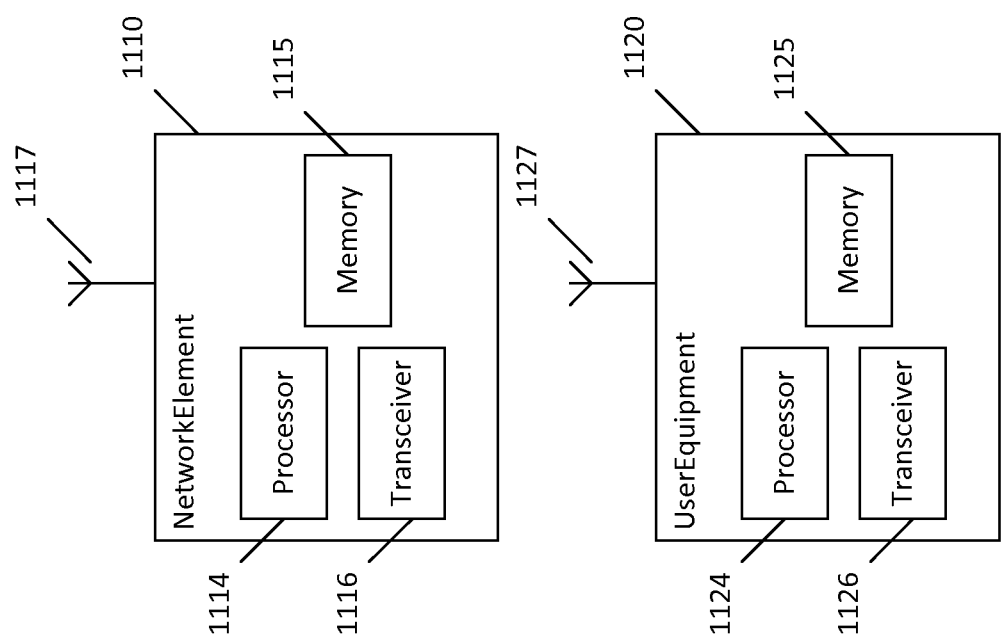
FIG. 11 illustrates an example of a network node apparatus and a user device.

FIG. 11 illustrates an example of a network element suitable for operating as an anchor access node according to embodiments described by means of FIGS. 5 and 6 to 10. It should be understood that each block of the flowcharts of FIGS. 5 and 10 may be implemented by various means or their combinations, such as hardware, software, firmware, one or more processors and/or circuitry. The network element of the example of FIG. 11 may also illustrate an apparatus suitable for operating as a target cell of cell reselection. Additionally, FIG. 11 illustrates an example of a user device (user equipment) according to embodiments described by means of FIGS. 4 and 6 to 10. It should be understood that each block of the flowcharts of FIGS. 4 and 10 may be implemented by various means or their combinations, such as hardware, software, firmware, one or more processors and/or circuitry. It should be appreciated that a network element may be suitable for operating as a target cell of a cell reselection.

Each of these devices may include at least one processor or control unit or module, respectively indicated as 1114 and 1124. At least one memory may be provided in each device, and indicated as 1115 and 1125, respectively. The memory may include computer program instructions or computer code contained therein, for example for carrying out the embodiments described above. One or more transceiver 1116 and 1126 may be provided, and each device may also include an antenna, respectively illustrated as 1117 and 1127. Although only one antenna each is shown, many antennas and multiple antenna elements may be provided to each of the devices. Other configurations of these devices, for example, may be provided. For example, network element 1110 and UE 1120 may be additionally configured for wired communication, in addition to wireless communication, and in such a case antennas 1117 and 1127 may illustrate any form of communication hardware, without being limited to merely an antenna.

Transceivers 1116 and 1126 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that may run on a server. In certain embodiments, much or all of the data processing may be provided in cloud processing servers, with access nodes essentially providing only basic radio functions.

A user device or user equipment 1120 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, digital camera, pocket video camera, navigation unit provided with wireless communication capabilities or any combinations thereof. The user device or user equipment 1120 may be a sensor or smart meter, or other device that may usually be configured for a single location.

In another example, an apparatus may comprise means for transmitting, by a user device in a low activity state a type of the low activity state being according to an anchor access node, a random access message to a network node providing a target cell of a cell reselection, means for transmitting, to the network node providing the target cell, in response to receiving a random access response for the random access message from the network node providing the target cell, a radio connection reactivation request, the reactivation request comprising an indication of an anchor network node of the user device, and means for receiving, in response to the radio connection reactivation request, a radio connection reactivation message indicating a radio connection reactivation to the anchor network node as a logical link associated with a radio link provided by the target cell of the cell reselection.

In another example, an apparatus may comprise means for receiving, by an anchor access node for a user device, a radio connection reactivation request in relation to a cell reselection procedure and during a state transition of the user device to a connected state, and means for carrying out a radio connection reactivation, wherein the radio connection is reactivated as a logical link associated with a radio link provided by a target cell of the cell reselection.

In yet another example, the apparatus may comprise means for carrying out the random access procedure with the user device and means for forwarding the reactivation request message to the anchor access node and the reactivation message to the user device. It may also comprise means for initiating the S-RRC establishment procedure with the user device, if it receives user device's context information from the anchor access node.

Processors 1114 and 1124 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 1115 and 1125 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors may be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 1110 and/or UE 1120, to perform any of the processes described above (see, for example, FIG. 8). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 11 illustrates a system including a network element 1110 and a UE 1120, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

Certain embodiments may have various benefits and/or advantages. For example, certain embodiments may permit a UE in inactive state (e.g. RRC Inactive or Light Connected) to reselect and camp on cells that belong to different RATs without the need for a UE autonomous RRC state change and without the need for a location update.

Certain embodiments may minimize UE battery consumption and may reduce network signaling overhead during inter-RAT inactive mode mobility, especially compared to approaches in which the UE is required to update its location during inter-RAT mobility.

Certain embodiments may permit a UE to benefit from the advantages of inactive states, such as RRC Inactive and Light Connected, during inter-RAT inactive mode mobility. This is not possible in legacy approaches, for example when a UE enters RRC Idle in the new RAT.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATION

AKA Authentication and key agreement
ECM EPS Connection Management
EMM EPS Mobility Management
EPS Evolved Packet System
IoT Internet of Things
LTE Long Term Evolution
MeNB Master eNB
MME Mobility Management Entity
MTC Machine Type Communications
M-MTC Massive-MTC
M-RRC Master Radio Resource Control
RACH Random Access Channel
RAN Radio Access Network
RRC Radio Resource Control
RRH Remote Radio Head
SCell Secondary cell
SCG Small Cell Group
SeNB Secondary eNB
S-GW Serving Gateway
TAU Tracking Area Update
UE User Equipment
U-MTC Ultra-reliable MTC
URLLC Ultra-Reliable Low Latency Communications
X-MBB Extreme Mobile Broadband

We claim:

1. A method, comprising:
   transmitting, by a user device in a low activity state a type of the low activity state being according to an anchor access node, a random-access message to a network node providing a target cell of a cell reselection;
   in response to receiving a random-access response for the random-access message from the network node providing the target cell and during a state transition to a connected state, transmitting, to the network node providing the target cell, a radio connection reactivation request, the radio connection reactivation request comprising an indication of the anchor access node of the user device, and
   in response to the radio connection reactivation request, receiving a radio connection reactivation message indicating a radio connection reactivation to the anchor access node as a logical link associated with a radio link provided by the target cell of the cell reselection or receiving an inactivation message.

2. The method of claim 1, wherein the radio connection reactivation request comprises authentication information, wherein a type of the authentication information is according to the anchor access node.

3. The method of claim 1, further comprising:
   during the state transition, establishing at least one secondary radio connection for a multi-connectivity service or relaying, wherein the anchor access node acts as master access node for the at least one additional radio connection.

4. The method of claim 1, carrying out a state transition to a connected state, and
   during the state transition, establishing at least one secondary radio connection for a multi-connectivity service or relaying, wherein the anchor access node acts as master access node for the at least one additional radio connection, wherein the user device stores context information, wherein a type of the context information is according to the anchor access node.

5. The method of claim 1, further comprising:
   transmitting completion messages for the radio connection reactivation and/or the establishing the at least one secondary radio connection.

6. The method of claim 1, wherein the radio connection reactivation request comprises data and an indication of the end of data load, further comprising:
   receiving the radio connection reactivation message indicating the radio connection reactivation as a temporal connection, or instead of receiving the radio connection reactivation message, receiving the inactivation message.

7. An apparatus, comprising:
   at least one processor; and
   at least one memory including computer program code,
   wherein the at least one memory and the computer program code are configured to, with the at least one processor, cause the apparatus at least to
   transmit, by a user device in a low activity state a type of the low activity state being according to an anchor access node, a random-access message to a network node providing a target cell of a cell reselection;
   in response to receiving a random-access response for the random-access message from the network node providing the target cell and during a state transition to a connected state, transmit, to the network node providing the target cell, a radio connection reactivation request, the radio connection reactivation request comprising an indication of the anchor access node of the user device, and
   in response to the radio connection reactivation request, receive a radio connection reactivation message indicating a radio connection reactivation to the anchor access node as a logical link associated with a radio link provided by the target cell of the cell reselection, or receive an inactivation message.

8. The apparatus of claim 7, wherein the radio connection reactivation request comprises authentication information, wherein a type of the authentication information is according to the anchor access node.

9. The apparatus of claim 7, wherein the at least one memory and the computer program code are configured to, with the at least one processor, cause the apparatus at least to:
   during the state transition, establish at least one secondary radio connection for a multi-connectivity service or relaying, wherein the anchor access node acts as master access node for the at least one additional radio connection.

10. The apparatus of claim 7, wherein the at least one memory and the computer program code are configured to, with the at least one processor, cause the apparatus at least to transmit completion messages for the radio connection reactivation and/or the establishing the at least one secondary radio connection.

11. The apparatus of claim 7, wherein the radio connection reactivation request comprises data and an indication of the end of data load, wherein the at least one memory and the computer program code are configured to, with the at least one processor, cause the apparatus at least to receive the radio connection reactivation message indicating the radio connection reactivation as a temporal connection, or instead of receiving the radio connection reactivation message, receiving the inactivation message.

* * * * *